[11] 3,609,586

[72] Inventor Ha
         Ma
[21] Appl. No. 834,328
[22] Filed June 18, 1969
[45] Patented Sept. 28, 1971
[73] Assignee Bell Telephone Laboratories Incorporated
         Murray Hill, N.J.

[54] LASER WITH PULSED TRANSMISSION MODE Q-SWITCHING
     4 Claims, 2 Drawing Figs.
[52] U.S. Cl.......................................... 331/94.5,
                                          250/199, 350/160
[51] Int. Cl......................................... H01s 3/11
[50] Field of Search............................. 331/94.5;
                               250/199; 350/160; 332/7.51

References Cited
UNITED STATES PATENTS

| | | | |
|---|---|---|---|
| 3,422,370 | 1/1969 | Collins, Jr.................... | 331/94.5 |
| 3,436,678 | 4/1969 | Sharp et al.................... | 331/94.5 |
| 3,466,565 | 9/1969 | Rigrod.......................... | 331/94.5 |
| 3,500,241 | 3/1970 | Bjorkholm..................... | 331/94.5 |
| 3,521,188 | 7/1970 | Sooy............................ | 331/94.5 |

*Primary Examiner*—William L. Sikes
*Attorneys*—R. J. Guenther and Arthur J. Torsiglieri ABSTRACT: A Q-switched solid state laser in which the pulse is dumped from the resonator is disclosed. The laser employs a first resonant etalon for selection of a single axial mode and a second electro-optic resonant etalon for the Q-switching and pulse dumping. The second etalon is employed as the output reflector of the resonator. Cooperation of the two etalons enables switching of the resonator condition with exceptionally small voltage and risetime requirements to drive the second etalon. Advantageously, one of the etalons can simultaneously produce a desired nonlinear optical effect.

INVENTOR
H. G. DANIELMEYER
BY
Wilford L. Wisner
ATTORNEY

LASER WITH PULSED TRANSMISSION MODE Q-SWITCHING

BACKGROUND OF THE INVENTION

This invention relates to pulsed lasers, especially those in which Q-switching of the pulsed-transmission mode type is desired.

Q-switching is a type of pulsed operation of a laser in which the resonator is maintained in a low-reflectivity, or low-Q, condition during which the population inversion in an active medium is built up beyond the normal level for the stimulated emission of radiation from that active medium. Typically, the low-Q condition is provided by a high transmissivity of one of the reflectors. The increased population inversion results from the continued storing of excitation energy by transfer of atoms or molecules of the active medium into an excited state called the upper energy level or state of the laser transition. At a later time, before spontaneous decay of the stored energy, the resonator is switched into a high-reflectivity, or high-Q, condition. A pulse of coherent light energy builds up within the laser resonator by the now well-known process of the stimulated emission of radiation.

The pulsed-transmission-mode operation of Q-switched lasers was developed to provide more efficient output coupling from the laser of the pulse of coherent light built up within the laser resonator. Basically, this mode of operation provides that, after a very brief high-Q condition which serves to start the stimulated emission of radiation process, the resonator is again switched to a low-Q high-transmissivity condition to facilitate extraction and subsequent utilization of the Q-switched pulse. Early proposals of this type suggested the straightforward use of electro-optic modulation and accompanying deflection of the light path within the resonator for polarized coherent light, for example, as disclosed in A. A. Vuylsteke U.S. Pat. No. 3,243,724, issued Mar. 29, 1966.

Unfortunately, such a scheme requires that a relatively large voltage be applied to the electro-optic modulator. For most electro-optic materials which are sufficiently clear or low in loss to be desirable for use within a laser resonator, the needed voltage is typically thousands of volts. For maximum peak output power one would like to dump the cavity within one round-trip time which may be one nanosecond. But switching several kilovolts within one nanosecond is difficult.

In addition, the laser output would consist of many axial modes. This is unfortunate for applications like holography or light scattering optical devices because of the frequency spread of the axial modes and unfortunate for applications like microwelding because power instabilities occur from pulse to pulse due to the competition between axial modes.

SUMMARY OF THE INVENTION

According to a principal feature of my invention, a Q-switched laser employing the pulsed transmission mode of operation includes in combination a first resonant etalon that selects a single axial mode of oscillation and a second electro-optic resonant etalon that provides the pulsed-transmission mode Q-switching, whereby the drive voltage of the second etalon is very small because it has to switch the laser across less than one axial mode spacing only. The risetime requirements of the switching pulse are small because of an exceptionally favorable switching characteristic of the arrangement, the output is essentially single frequency, and the pulse to pulse reproducibility is improved because of absence of mode competition effects.

BRIEF DESCRIPTION OF THE DRAWING

A more complete understanding of the invention and of its other features and advantages may be grasped from the following detailed description, taken together with the drawing, in which.

DESCRIPTION OF ILLUSTRATIVE EMBODIMENT

Figure 1:
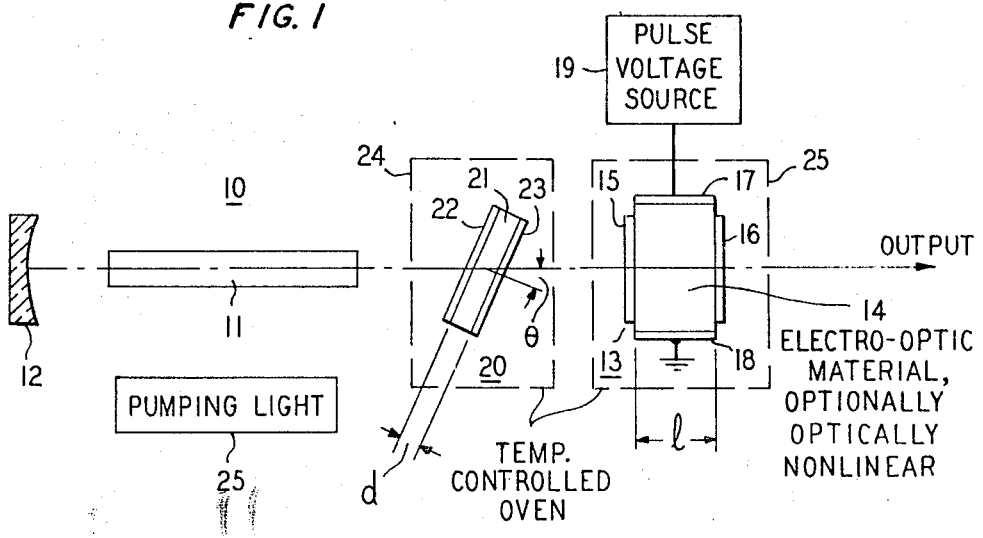
FIG. 1 is a partially pictorial and partially block diagrammatic illustration of a preferred embodiment of the invention.

In the embodiment of FIG. 1, it is desired that laser 10 produce Q-switched pulses of coherent light at a single frequency in a single axial mode illustratively of the 1.06 micrometer transition which is readily obtained from an active medium 11 including neodymium ions ($N_d^{+3}$) in a suitable host crystal such as yttrium aluminum garnet.

The pulses are initiated and coupled out efficiently by the pulsed transmission of the output reflector 13, which is an electro-optic resonant etalon.

The optical resonator is completed by the end reflector 12, which is disposed opposite output reflector 13 along the axis of the active medium 11. The multiplicity of axial modes which such an optical resonator will support is reduced, preferably to one, by the birefringent resonant etalon 20, which is tilted so that the normals to its major surfaces lie at a small angle $\theta$, e.g., a few minutes of arc, with respect to the axis of the optical resonator.

THe electro-optic resonant etalon 13 is driven by a voltage pulse of suitable shape, e.g., an approximately rectangular wave, from a pulse voltage source 19 connected between electrodes 17 and 18. The stability of the single frequency of the Q-switched pulse throughout its duration is promoted by placing both etalons 20 and 13 in temperature-controlled environments, illustratively termed ovens 24 and 26 in FIG. 1, and by stabilizing the cavity length. It is preferred to provide each etalon its own oven as shown in FIG. 1.

The composition of the active medium 11 is conventional, as is also the reflector 12.

The resonant etalon 20 illustratively comprises a thin plate 21 of a possibly birefringent material such as quartz, calcite or lithium niobate with highly flat parallel major surfaces and reflective coatings 22 and 23 on those major surfaces. The reflective coatings 22 and 23 are provided according to known techniques with equal reflectivities for the laser radiation sufficient to obtain effective selection of just one axial mode of oscillation. Its thickness, $d$, between coatings 22 and 23 is chosen so that the free spectral range is greater than one-half the width of the gain-versus-frequency profile of the laser. This profile is shown in curve 31 of FIG. 2 and represents the amplitude versus frequency for various oscillations that can be obtained with appropriate tuning.

The free spectral range referred to above is $c/2nd$, where $c$ is the velocity of light, $n$ is the pertinent index of refraction of the crystal 21 and $d$ is its thickness between reflectors 22 and 23.

The temperatures of the ovens 24 and 25 are set at values to tune both pertinent etalon transmissions to one frequency close to line center with no voltage signal applied from source 19.

The electro-optic resonant etalon 13, which is also the output reflector of the optical resonator illustratively comprises a crystal 14 of lithium niobate or other suitable electro-optic material. Its reflective coatings are provided according to known techniques to provide a high reflectivity when no transmission peak of etalon 13 is in coincidence with a transmission peak of etalon 20. For a sufficient separation of these respective transmission peaks, the optical resonator of the laser will be in a high-Q condition. Illustratively, coatings 15 and 16 are provided with 90 percent reflectivities, which will provide in combination a total reflectivity of 99.75 percent for reflector 13.

The free spectral range of reflector 13 considered as a resonant etalon is made somewhat different from that of etalon 20, e.g., by choice of a different thickness, $l$, or more generally, a different optical path length therein.

The operation of the embodiment of FIG. 1 is readily explained with reference to the curves of FIG. 2.

Figure 2:
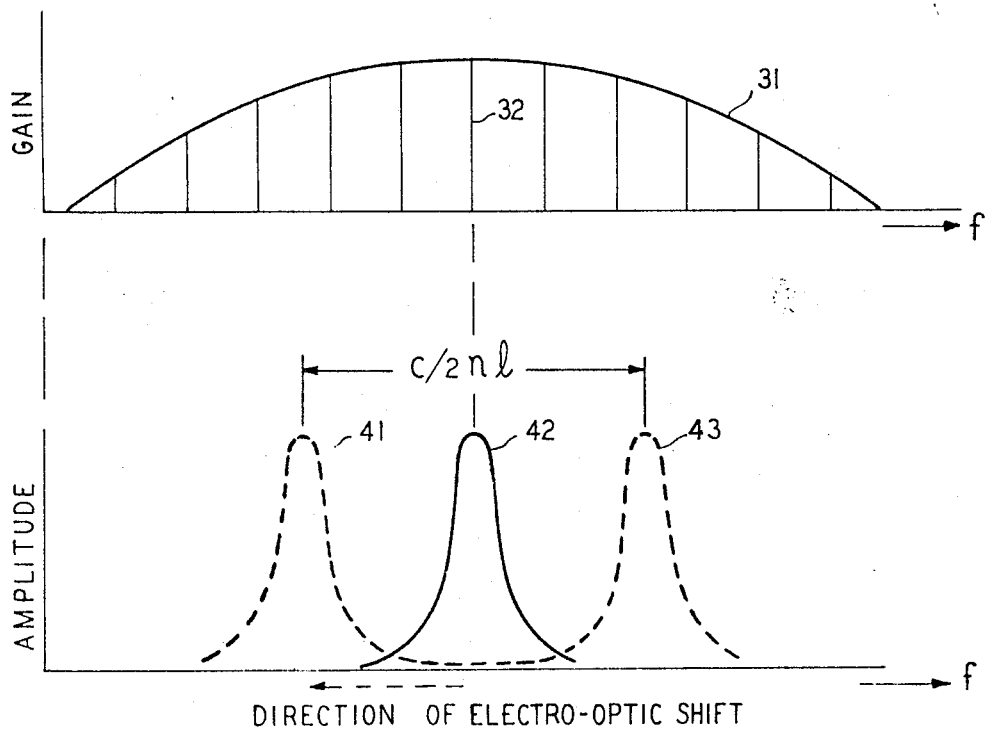
FIG. 2 shows curves which are useful in understanding the operation of the invention.

In FIG. 2, curve 31 is the gain profile, or gain-versus-frequency profile, of laser 10. The vertical lines thereunder represent the resonant axial modes obtainable in the high Q-condition of the resonator in the absence of etalon 20. Curve 42 represents the only transmission peak of etalon 20 which is within the width of the profile 31, sometimes called the linewidth.

Curve 41 represents a first transmission peak of electro-optic etalon 13 which coincides wit peak 42 of etalon 20 at one extreme of the voltage waveform from source 19. The voltage waveform from source 19 has a magnitude and polarity which thereafter sweeps the transmission peak 41 away from peak 42 of etalon 20, as shown in FIG. 2, and thereafter brings the peak 41 of etalon 13 back into coincidence with peak 42. Alternatively, the voltage waveform could also sweep peak 43 into coincidence.

Before the transmission peak 41 of etalon 13 is shifted away from the transmission peak 42 of etalon 20, the population inversion in medium 11 is built up to a high level by pumping light 25, which is a typical laser excitation source, or by other means of excitation. The buildup of the population inversion is aided by the low-Q condition of the resonator.

As the voltage waveform shifts peak 41 away from peak 42, the resonator Q rises sufficiently that the stimulated emission of radiation starts. Very quickly, the Q-switched pulse of coherent optical energy is being resonated.

As the pulse reaches its peak level the voltage waveform from source 19 moves the transmission peak 41 of etalon 13 back into coincidence with peak 42. Alternatively the voltage waveform could have moved peak 43 into coincidence with peak 42. The resonator is again in a low-Q condition; and the pulse is readily transmitted from the resonator. This process is sometimes called cavity dumping.

The essential cooperation of the invention is that, as indicated in FIG. 2, a shift of only half the free spectral range, $c/4nl$, of etalon 13 will produce the change from a low-Q to a high-Q condition of the cavity. By increasing the length $l$ of the etalon, one can reduce the needed frequency shift and thereby the drive voltage required. For a 1 cm. long, 4 mm. square lithium Niobate crystal, for instance, 800 volts applied along the c-axis of the lithium niobate would suffice. Now the shape of the transmission curves (41, 43) for 90 percent coatings (15, 16) is such that the laser cavity opens and closes in about a tenth of the time required to shift the etalon frequency by $c/4nl$. Therefore, even if the 800 volt pulse has rise of fall times of 10 nanoseconds, the cavity will effectively be dumped in 1 nanosecond. These reductions in drive requirements combine with the characteristically fast electro-optic switching speeds and reproducible single mode pulse output from a continuously pumped laser. The reproducibility, the single mode, and the continuous pumping are all very desirable.

As a modification, it is noted that the driving voltage waveform from source 19 may be modified experimentally for maximum peak output power. To a first approximation, this may be accomplished by varying the risetime of the voltage waveform.

It should be clear that other electro-optic materials are usable for crystal 14, that a number of other birefringent or even nonbirefringent materials may be used for crystal 21, and that they may be phase matchable at appropriate temperature for simultaneous second harmonic generation. Illustratively, lithium niobate crystal 14 in FIG. 1 is appropriately oriented for this purpose, in that the c-axis is orthogonal to the laser axis.

In the event that improved long term stability of the laser oscillation is desired, the feedback control arrangement of my copending patent application Ser. No. 819,877, filed Apr. 28, 1969, may be employed in conjunction with my present invention. In that case, etalon 20 includes a birefringent crystal 21 and provides favorable conditions for oscillation of a second mode, orthogonally polarized with respect to the principal mode of interest, at a slightly different frequency. The orthogonally polarized second mode will not be Q-switched by etalon 13, for special crystal orientations, so that the second mode can be used for stabilization of the cavity length.

I claim:

1. A laser of the type comprising an active medium and an optical resonator including means for Q-switching the resonator in a pulsed-transmission mode, said laser being characterized in that said resonator includes along the axis thereof
   means for selecting resonantly axial modes of optical radiation for oscillation in said laser, and in which the Q-switching means includes
   means for simultaneously forming one reflector of said resonator and modulating resonantly and electro-optically the optical radiation in axial modes selected by said selecting means, whereby the voltage and risetimes of the switching pulse effective to produce the Q-switching in a pulsed-transmission mode are smaller than in such a laser not so characterized.

2. A laser of the type claimed in claim 1 in which the selecting means includes a first resonant etalon tilted and coated to have surface reflectivities effective to aid mode selection, the free spectral range of said first etalon being greater than one-half the width of the gain-versus-frequency profile of said laser.

3. A laser of the type claimed in claim 2 in which the forming and modulating means includes a second resonant etalon including electro-optic material and means for driving said material with a voltage applied to produce electro-optic modulation of the optical length of the cavity.

4. A laser of the type claimed in claim 3 in which the electro-optic material is also optically nonlinear and is oriented for concurrent transverse electro-optic modulation of optical radiation and a nonlinear optical effect producing a second harmonic of said radiation.